United States Patent [19]

Nomura et al.

[11] 4,396,322
[45] Aug. 2, 1983

[54] CONTACT DETECTING APPARATUS

[75] Inventors: Kenji Nomura, Aichi; Akira Tsuboi, Kariya; Kunihiko Eto, Toyota; Kunimichi Nakashima, Anjo, all of Japan

[73] Assignee: Toyoda Koki Kabushiki Kaisha, Kariya, Japan

[21] Appl. No.: 218,678

[22] Filed: Dec. 22, 1980

[51] Int. Cl.³ .................. B23Q 11/00; B23C 1/00; B23B 47/00
[52] U.S. Cl. ........................ 409/134; 408/6; 408/8; 408/11; 409/233
[58] Field of Search ............. 29/568, 26 A, 26 R; 408/6, 8, 11, 13, 2, 35; 409/134, 233, 193

[56] References Cited

U.S. PATENT DOCUMENTS

| | | | |
|---|---|---|---|
| 3,133,457 | 5/1964 | Martens | 408/6 |
| 3,636,814 | 1/1972 | Esch | 408/8 X |
| 4,135,848 | 1/1979 | Hughes et al. | 409/233 X |
| 4,203,691 | 5/1980 | Nishimura et al. | 408/8 |
| 4,329,771 | 5/1982 | Eto et al. | 29/568 |

FOREIGN PATENT DOCUMENTS

| | | | |
|---|---|---|---|
| 54-35490 | 3/1979 | Japan | 408/6 |
| 54-113580 | 9/1979 | Japan | 409/233 |
| 55-31542 | 3/1980 | Japan | 408/6 |
| 2003407 | 3/1979 | United Kingdom | 408/6 |
| 520227 | 8/1976 | U.S.S.R. | 408/6 |

Primary Examiner—William R. Briggs
Attorney, Agent, or Firm—Oblon, Fisher, Spivak, McClelland & Maier

[57] ABSTRACT

A contact detecting apparatus for detecting the contact between a workpiece and a tool in a machine tool which includes a coil mounted on a spindle head and connected to an AC power source for generating an induced current in a looped secondary circuit including the workpiece, a work table, a machine body, a spindle head, a brush, a clamp bar for clamping the tool on a tool spindle, springs interposed between the spindle and the clamp bar, the tool spindle and the tool, when the workpiece and the tool are moved relatively into contact with each other. The brush is kept contact with the clamp bar at the rotational axis of the tool spindle. A detector is connected between the AC power source and the coil for detecting a change in an electric signal caused by the contact between the workpiece and the tool.

4 Claims, 2 Drawing Figures

CONTACT DETECTING APPARATUS

BACKGROUND OF THE INVENTION

1. Field of the Invention

The present invention relates to a contact detecting apparatus for detecting the contact of a tool with a workpiece when they are moved relative to each other.

2. Description of the Prior Art

As disclosed in U.S. Pat. No. 4,203,691, a conventional contact detecting apparatus is provided with a coil mounted on the end of a spindle head in which a spindle is rotatably received. This coil is connected to an AC power source to be energized, so that the coil generates loops of magnetic flux surrounding the spindle which induces current in a direction of the spindle. When a tool does not contact a workpiece, a looped secondary circuit connecting the spindle and a machine body is not completed, whereby there is no induced current. On the other hand, when the tool contacts the workpiece, the looped secondary circuit is completed to produce induced current. In this way, the secondary circuit is completed depending upon the contact between the tool and the workpiece, and an exciting current in the coil on the primary side is changed depending upon the change in electric current in the secondary circuit. Accordingly, the contact between the tool and the workpiece can be detected.

With this method, an electric resistance in the secondary circuit affects the detecting sensitivity. In particular, an oil film formed on bearings supporting the rotating spindle serves as an insulator, whereby there has to be provided a brush for bypassing an electric resistance in the bearings. This brush is easily worn out to shorten its life when the spindle is rotated at high speed. Accordingly, it is preferrable to make the brush contact at the axis of spindle rotation, where relative speed is minimum. However, in a machine tool with an automatic tool change apparatus, a clamp bar engageable with a pull stud of a tool received in a spindle passes through the spindle in coaxial relationship therewith, and an unclamping cylinder for unclamping the tool is disposed in face to face relationship with the end surface of the clamp bar, so that it was difficult to make the brush contact at the axis of spindle rotation.

SUMMARY OF THE INVENTION

It is, therefore, an object of the present invention to provide an improved contact detecting apparatus capable of prolonging the life of a brush to bypass electric resistance of the spindle bearings.

Another object of the present invention is to provide an improved contact detecting apparatus of the character set forth above, wherein the brush is disposed on contact with the end surface of a clamp bar engageable with a tool received in a spindle to clamp the same.

Briefly, according to the present invention, these and other objects are achieved by providing a contact detecting apparatus in a machine tool including a machine body, a work table mounted on the machine body for mounting thereon a workpiece to be machined, a spindle head mounted on the machine body, a tool spindle rotatably supported in the spindle head for removably supporting a tool, a clamp bar received in the tool spindle in coaxial relationship therewith and engageable with the tool for clamping the same relative to the tool spindle, spring means interposed between the tool spindle and the clamp bar for urging the clamp bar in a direction to clamp the tool, unclamping means for moving the clamp bar against the spring means to unclamp the tool, and control means for effecting relative movement between the work table and the tool spindle, as mentioned below. A brush is disposed in contact engagement with one of the clamp bar and the rear of the tool spindle and is electrically connected to the spindle head. A coil is mounted on the spindle head and connected to an AC power source for generating an induced current in a looped secondary circuit including the workpiece, work table, machine body, spindle head, brush, tool spindle and tool, when the workpiece and the tool are moved relatively into contact with each other. Also provided are means connected between the AC power source and the coil for detecting a change in an electric signal caused by the contact between the workpiece and the tool.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
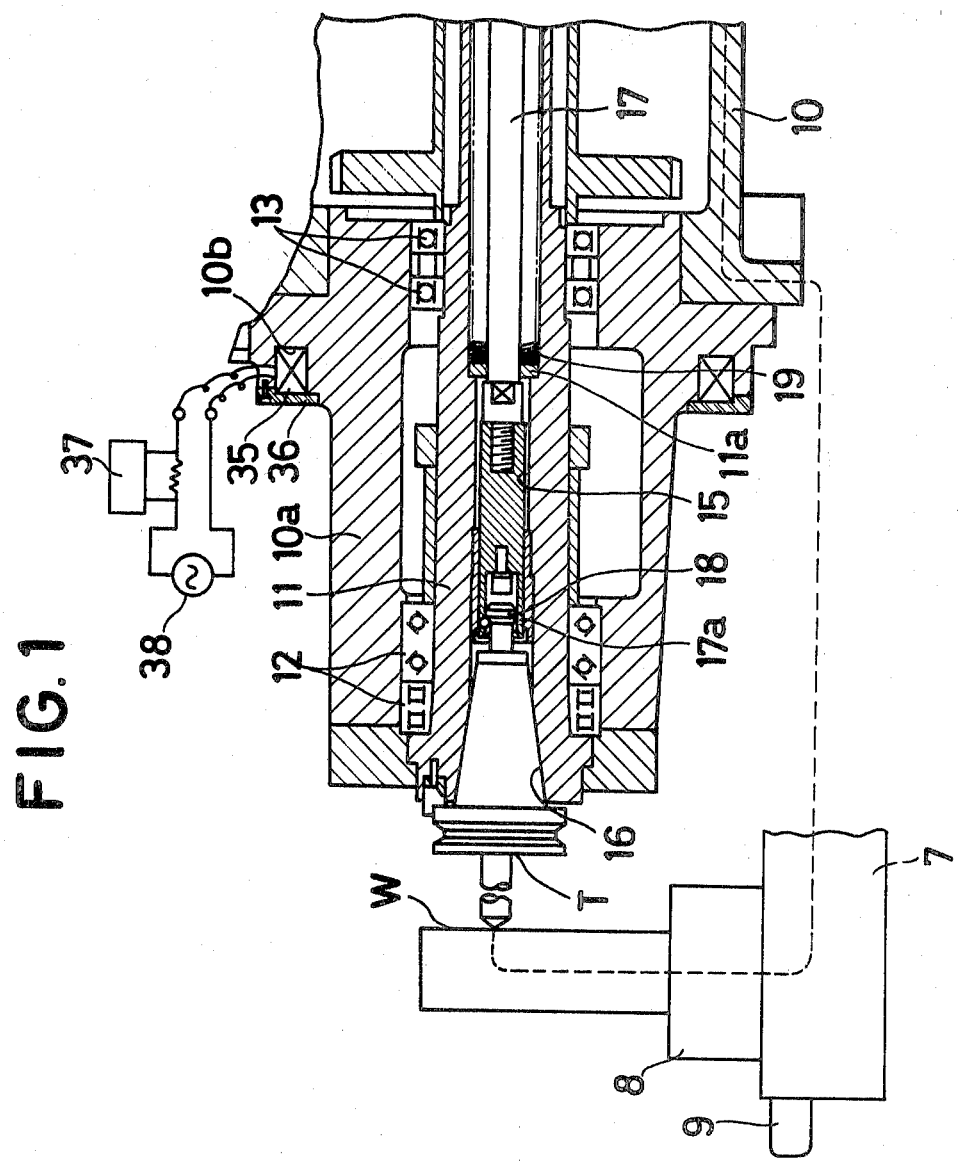
FIG. 1 is a longitudinal sectional view of the front portion of the spindle assembly showing a portion of the contact detecting apparatus according to the present invention.
Figure 1A:
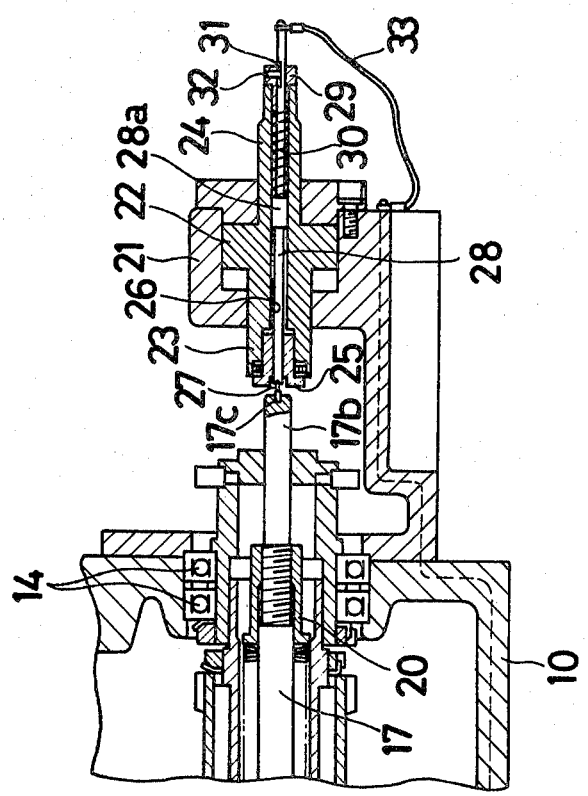
FIG. 1A is a longitudinal sectional view of the rear portion of the spindle assembly and an unclamping cylinder incorporating a brush of the contact detecting apparatus.

Referring now to the drawings, wherein like reference numerals or characters refer to identical or corresponding parts throughout the several views, and more particularly to FIGS. 1 and 1A, a workpiece W to be machined is mounted on a work table 8, which is, in turn, slidably mounted on a machine body 7 of a machine tool with an automatic tool change apparatus (not shown). The work table 8 is moved by a drive motor 9 secured to the machine body 7 in a well known manner. A spindle head 10 is secured to the machine body 7 to rotatably support a tool spindle 11 through bearings 12, 13 and 14. The spindle 11 is formed along the axis thereof with a tool receiving tapered bore 16 and a through bore 15 connected to the tapered bore 16. Within the through bore 15, there is received a clamp bar 17 provided at its front end with a snap member 17a engageable with a pull stud 18 extended from one end of a tool T received in the tapered bore 16. The rear end 17b of the clamp bar 17 is projected from the rear end of the tool spindle 11. A set of washer springs 19 are disposed between the shoulder portion 11a of the tool spindle 11 and a flange member 20 secured on the clamp bar 17 for drawing the clamp bar 17 in the rearward direction to clamp the tool T relative to the spindle 11.

In face to face relationship with the rear end 17b of the clamp bar 17, there is disposed an unclamping cylinder 21 mounted on the spindle head 10. A piston 22 is slidably received in the unclamping cylinder 21 in coaxial relationship with the rotational axis of the spindle 11 and formed at opposite ends thereof with piston rods 23 and 24 which project from the unclamping cylinder 21 in opposite directions. The piston rod 23 of the piston 22 rotatably supports at its front end an abutting member 25 engageable with the rear end 17b of the clamp bar 17. Within the abutting member 25, piston 22 and piston rods 23, 24, there is formed a through bore 26 in which a support rod 28 is slidably received. The support rod 28 supports at its front end a brush 27 in contact engagement on the rotational axis of the spindle 11 with a contact member 17c made of copper alloy and embedded into the rear end 17b of the clamp bar 17. A compression spring 30 is disposed between an enlarged portion 28a of the support rod 28 and an end cover member 29 secured to the rear end of the piston rod 24 for urging the support rod 28 in a forward direction to contact the brush 27 with the contact member 17c. The support rod 28 is formed with a key-way 31 along the axis thereof into which a key member 32 projected from the cover member 29 is engaged to prevent rotation of the support rod 28, but to allow axial movement of the support rod 28. When the piston 22 is moved in the forward direction from the position shown in FIG. 1A to bring the abutting member 25 into engagement with the rear end 17b of the clamp bar 17 so as to unclamp the tool T, the spring 30 is further compressed and contact engagement between the brush 27 and the contact member 17c is maintained. The rear end of the support rod 28 projecting from the cover member 29 is connected to one end of a conductive wire 33 whose other end is connected to the spindle head 10.

With this arrangement, the tool T received in the tool spindle 11 is electrically connected to the spindle head 10 without the aid of the bearings 12, 13 and 14 rotatably supporting the spindle 11. More particularly, the tool T is conductive with the spindle 11 through tight fitting therebetween at the tapered bore 16. The spindle 11 is conductive through the springs 19 to the clamp bar 17 which is, in turn, conductive through the brush 27 to the support rod 28. The support rod 28 is conductive to the spindle head 10 through the wire 33.

On the front portion 10a of the spindle head 10, there is formed an annular groove 10b into which an induction coil 35 is received. The coil 35 is wound around an iron core which surrounds the spindle 11. The coil 35 is held in the annular groove 10b by a cover plate 36 made of an insulating material and secured to the front portion 10a of the spindle head 10. When this coil 35 is excited by an AC power source 38, a current is induced in the looped secondary circuit that is completed by the contact between the tool T and the workpiece W. The looped secondary circuit includes the workpiece W, work table 8, machine body 7, spindle head 10, conductive wire 33, support rod 28, brush 27, clamp bar 17, springs 19, tool spindle 11 and the tool T. When the tool T and the workpiece W and moved apart, the looped secondary circuit is not completed, whereby no induced current is induced. The change in the secondary circuit causes a change in exciting current of the coil 35 on the primary side. The change in the exciting current of the coil 35 is detected by a detecting circuit 37 to detect the contact between the tool T and the workpiece W.

Obviously, numerous modifications and variations of the present invention are possible in light of the above teachings. It is to be understood, therefore, that within the scope of the appended claims, the invention may be practiced otherwise than as specifically described herein.

What is claimed is:

1. In a machine tool including a machine body, a work table mounted on said machine body for mounting thereon a workpiece to be machined, a spindle head mounted on said machine body, a tool spindle rotatably supported in said spindle head for removably supporting a tool, a clamp bar received in said tool spindle in coaxial relationship therewith and engageable with said tool for clamping the same relative to said tool spindle, spring means interposed between said tool spindle and said clamp bar urging said clamp bar in a direction to clamp said tool, unclamping means for moving said clamp bar against said spring means to unclamp said tool, and control means for effecting relative movement between said work table and said tool spindle, a contact detecting apparatus comprising:

a brush disposed in contact engagement with said clamp bar in coaxial alignment therewith and electrically connected to said spindle head;

an AC power source;

a coil mounted on said spindle head and connected to said AC power source for generating an induced current in a looped secondary circuit including the workpiece, work table, machine body, spindle head, brush, tool spindle and tool, when said workpiece and said tool are moved relatively into contact with each other; and means connected between said AC power source and said coil for detecting a change in an electric signal caused by the contact between said workpiece and said tool.

2. A contact detecting apparatus as set forth in claim 1, wherein said clamp bar further comprises a contact member made of copper alloy in contact with said brush.

3. A contact detecting apparatus as set forth in claim 1 or 2, wherein said unclamping means further comprises a hydraulic cylinder disposed in face to face relationship with said clamp bar, and a piston slidably received in said hydraulic cylinder in axial relationship with said tool spindle and provided with a piston rod engageable with the end surface of said clamp bar, and wherein said contact detecting apparatus further comprises a support rod slidably received in said piston in coaxial relationship therewith and supporting said brush at a first end thereof, and spring means disposed between said piston and said support rod for urging said brush into contact with said clamp bar, a second end of said support rod being electrically connected to said spindle head.

4. A contact detecting apparatus as set forth in claim 3, further comprising means for preventing rotation but allowing axial movement of said support rod relative to said piston.

* * * * *